(12) United States Patent
Anand et al.

(10) Patent No.: US 12,047,858 B2
(45) Date of Patent: *Jul. 23, 2024

(54) SYSTEM AND METHOD FOR CALL MANAGEMENT

(71) Applicant: RAPIDSOS, INC., New York, NY (US)

(72) Inventors: Preet Anand, San Mateo, CA (US); Peter Antypas, Emeryville, CA (US); Motiejus Osipovas, Edmonton, CA (US)

(73) Assignee: RAPIDSOS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,233

(22) Filed: Apr. 25, 2023

(65) Prior Publication Data

US 2023/0262438 A1 Aug. 17, 2023

Related U.S. Application Data

(63) Continuation of application No. 17/671,493, filed on Feb. 14, 2022, now Pat. No. 11,659,375.

(51) Int. Cl.
*H04W 4/02* (2018.01)
*G01S 5/14* (2006.01)
(Continued)

(52) U.S. Cl.
CPC ............. *H04W 4/90* (2018.02); *G01S 5/14* (2013.01); *G01S 19/46* (2013.01); *H04W 4/02* (2013.01);
(Continued)

(58) Field of Classification Search
CPC ................. H04L 67/02; H04W 4/90
(Continued)

(56) References Cited

U.S. PATENT DOCUMENTS 5,013,271 A 5/1991 Bartlett
5,022,878 A 6/1991 Casad
(Continued)

FOREIGN PATENT DOCUMENTS

CA 2662606 A1 10/2009
CA 2697986 A1 9/2010
(Continued)

OTHER PUBLICATIONS

Meier. MatchApp: Next Generation Disaster Response App? iRevolution (12 pgs) (Feb. 27, 2013).
(Continued)

*Primary Examiner* — Qutbuddin Ghulamali
(74) *Attorney, Agent, or Firm* — Cygan Law Offices PC; Joseph T. Cygan

(57) ABSTRACT

A system and method are provided in accordance with the various aspects of the invention that enhance the information regarding a caller and a call location. Such calls are typically sent to a dispatcher that handles urgent or emergency calls. The information provided can be in the form of a message that is includes specifics about the call initiator and the nature of and/or reason for the call; a message that is converted to verbal form from text-to-speech; and/or the message may include location information, especially as it relates to representing a wireless device as a landline location based on nearby communication options, such as Wi-Fi or Bluetooth beacons.

20 Claims, 6 Drawing Sheets

(51) Int. Cl.
*G01S 19/46* (2010.01)
*H04W 4/029* (2018.01)
*H04W 4/90* (2018.01)
*H04W 76/50* (2018.01)
*H04L 67/02* (2022.01)
*H04W 80/12* (2009.01)

(52) U.S. Cl.
CPC ............ *H04W 4/025* (2013.01); *H04W 4/029* (2018.02); *H04W 76/50* (2018.02); *H04L 67/02* (2013.01); *H04W 80/12* (2013.01)

(58) Field of Classification Search
USPC ...................................................... 455/404.2
See application file for complete search history.

(56) References Cited

U.S. PATENT DOCUMENTS

| | | |
|---|---|---|
| 5,379,337 A | 1/1995 | Castillo et al. |
| 5,479,482 A | 12/1995 | Grimes |
| 5,563,931 A | 10/1996 | Bishop et al. |
| 5,596,625 A | 1/1997 | Leblanc |
| 5,710,803 A | 1/1998 | Kowal et al. |
| 5,712,666 A | 4/1998 | Alpert |
| 6,014,555 A | 1/2000 | Tendler |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,262,655 B1 | 7/2001 | Yoshioka et al. |
| 6,292,687 B1 | 9/2001 | Lowell et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,084,775 B1 | 8/2006 | Smith |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,277,705 B2 * | 10/2007 | Casaccia ............ H04W 48/18 455/435.2 |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III et al. |
| 7,519,372 B2 | 4/2009 | Macdonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,027,658 B2 | 9/2011 | Suryanarayana et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Peiett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,494,868 B2 | 7/2013 | Saalsaa |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,761,721 B2 | 6/2014 | Li |
| 8,792,867 B1 | 7/2014 | Negahban et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,903,355 B2 | 12/2014 | Biage et al. |
| 8,918,075 B2 | 12/2014 | Maier et al. |
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 * | 4/2015 | Hodgson ............ H04M 1/72421 455/411 |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |

(56) References Cited

U.S. PATENT DOCUMENTS

| | | |
|---|---|---|
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,390,625 B2 | 7/2016 | Green et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,497,585 B1 | 11/2016 | Cooley et al. |
| 9,503,876 B2 | 11/2016 | Saito et al. |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| 9,629,185 B1 | 4/2017 | Gluckman et al. |
| 9,635,534 B2 | 4/2017 | Maier et al. |
| 9,648,479 B2 | 5/2017 | Michaelis et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,794,755 B1 | 10/2017 | South et al. |
| 9,805,430 B2 | 10/2017 | Miasnik et al. |
| 9,838,858 B2 | 12/2017 | Anand et al. |
| 9,877,177 B2 | 1/2018 | Lesage et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,994,218 B2 | 6/2018 | Pal et al. |
| 9,998,507 B2 | 6/2018 | Mehta et al. |
| 10,002,375 B1 | 6/2018 | Scythes et al. |
| 10,089,854 B2 | 10/2018 | Hender et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,142,469 B2 | 11/2018 | Klaban |
| 10,142,816 B2 | 11/2018 | Cavendish et al. |
| D835,151 S | 12/2018 | Martin et al. |
| 10,149,116 B1 | 12/2018 | Kerr et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,425,799 B2 | 9/2019 | Anand et al. |
| 10,447,865 B2 | 10/2019 | Mehta et al. |
| 10,524,106 B1 | 12/2019 | Skertich et al. |
| 10,657,799 B2 | 5/2020 | Mehta et al. |
| 10,701,541 B2 | 6/2020 | Mehta et al. |
| 10,701,542 B2 | 6/2020 | Martin et al. |
| 10,708,412 B1 | 7/2020 | Killpack |
| 10,771,951 B2 | 9/2020 | Mehta et al. |
| 10,795,870 B1 | 10/2020 | Kulkarni |
| 10,805,786 B2 | 10/2020 | Pellegrini et al. |
| 10,820,181 B2 | 10/2020 | Horelik et al. |
| 10,861,320 B2 | 12/2020 | Martin et al. |
| 10,911,926 B2 | 2/2021 | Pellegrini et al. |
| 11,140,538 B2 | 10/2021 | Mehta et al. |
| 11,146,680 B2 | 10/2021 | Leavitt et al. |
| 11,153,737 B2 | 10/2021 | Anand et al. |
| 10,922,776 B2 | 12/2021 | Kumar et al. |
| 11,197,145 B2 | 12/2021 | Martin et al. |
| 11,218,584 B2 | 1/2022 | Martin et al. |
| 11,228,891 B2 | 1/2022 | King-Berkman et al. |
| 11,330,664 B1 | 5/2022 | Martin et al. |
| 2001/0036224 A1 | 11/2001 | Demello |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | Mccalmont et al. |
| 2003/0195775 A1 | 10/2003 | Hampton et al. |
| 2004/0166828 A1 | 8/2004 | Yosioka |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0002516 A1 | 1/2005 | Shtivelman |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0176403 A1 | 8/2005 | Lalos |
| 2005/0190053 A1 | 9/2005 | Dione |
| 2005/0190892 A1 | 9/2005 | Dawson et al. |
| 2005/0192746 A1 | 9/2005 | King et al. |
| 2005/0220277 A1 | 10/2005 | Blalock et al. |
| 2005/0222829 A1 | 10/2005 | Dumas |
| 2005/0239477 A1 | 10/2005 | Kim et al. |
| 2005/0242944 A1 | 11/2005 | Bankert et al. |
| 2005/0282518 A1 | 12/2005 | D'Evelyn et al. |
| 2005/0285181 A1 | 12/2005 | Yasui et al. |
| 2006/0085275 A1 | 4/2006 | Stokes et al. |
| 2006/0109960 A1 | 5/2006 | D'Evelyn et al. |
| 2006/0154642 A1 | 7/2006 | Scannell, Jr. |
| 2006/0217105 A1 | 9/2006 | Kumar P S et al. |
| 2006/0234726 A1 | 10/2006 | Ashley, Jr. et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0188198 A1 | 8/2008 | Patel et al. |
| 2008/0194238 A1 | 8/2008 | Kwon |
| 2008/0253535 A1 | 10/2008 | Sherry et al. |
| 2008/0274721 A1 | 11/2008 | Stagnetto |
| 2008/0294058 A1 | 11/2008 | Shklarski |
| 2008/0309486 A1 | 12/2008 | Mckenna et al. |
| 2009/0018875 A1 | 1/2009 | Monatesti et al. |
| 2009/0041206 A1 | 2/2009 | Hobby et al. |
| 2009/0134982 A1 | 5/2009 | Robertson et al. |
| 2009/0186596 A1 | 7/2009 | Kaltsukis |
| 2009/0214000 A1 | 8/2009 | Patel et al. |
| 2009/0233573 A1 | 9/2009 | Gray |
| 2009/0257345 A1 | 10/2009 | King |
| 2009/0280771 A1* | 11/2009 | Bolin .............. H04L 12/66 455/404.2 |
| 2009/0284348 A1 | 11/2009 | Pfeffer |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003954 A1 | 1/2010 | Greene et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159871 A1 | 6/2010 | Tester |
| 2010/0159976 A1 | 6/2010 | Marocchi et al. |
| 2010/0161727 A1 | 6/2010 | Shaffer et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett et al. |
| 2010/0291907 A1 | 11/2010 | Macnaughtan |
| 2010/0317317 A1 | 12/2010 | Maier et al. |
| 2011/0009086 A1 | 1/2011 | Poremba et al. |

(56) References Cited

U.S. PATENT DOCUMENTS

| | | |
|---|---|---|
| 2011/0029600 A1 | 2/2011 | Theimer |
| 2011/0044444 A1 | 2/2011 | Abramson |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0151829 A1 | 6/2011 | Velusamy et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Hamalainen et al. |
| 2011/0281547 A1 | 11/2011 | Cordero |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0066139 A1 | 3/2012 | Guzman et al. |
| 2012/0092161 A1 | 4/2012 | West |
| 2012/0144019 A1 | 6/2012 | Zhu et al. |
| 2012/0146809 A1 | 6/2012 | Oh et al. |
| 2012/0157795 A1 | 6/2012 | Chiu et al. |
| 2012/0196557 A1 | 8/2012 | Reich et al. |
| 2012/0196558 A1 | 8/2012 | Reich et al. |
| 2012/0202428 A1 | 8/2012 | Mirbaha et al. |
| 2012/0210325 A1 | 8/2012 | De Lind Van Wijngaarden |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0295576 A1 | 11/2012 | Peterson |
| 2012/0309341 A1 | 12/2012 | Ward |
| 2012/0320912 A1 | 12/2012 | Estrada et al. |
| 2013/0005295 A1 | 1/2013 | Park et al. |
| 2013/0012155 A1 | 1/2013 | Forstall et al. |
| 2013/0030825 A1 | 1/2013 | Bagwandeen et al. |
| 2013/0036175 A1 * | 2/2013 | Lau .................. H04M 3/42357 709/206 |
| 2013/0052983 A1 | 2/2013 | Fletcher et al. |
| 2013/0065569 A1 | 3/2013 | Leipzig et al. |
| 2013/0082837 A1 | 4/2013 | Cosentino et al. |
| 2013/0084824 A1 | 4/2013 | Hursey |
| 2013/0102351 A1 | 4/2013 | Mo |
| 2013/0120106 A1 | 5/2013 | Cauwels et al. |
| 2013/0120459 A1 | 5/2013 | Dickinson et al. |
| 2013/0122932 A1 | 5/2013 | Patel et al. |
| 2013/0138791 A1 | 5/2013 | Thomas et al. |
| 2013/0143530 A1 | 6/2013 | Erlich |
| 2013/0183924 A1 | 7/2013 | Saigh et al. |
| 2013/0185368 A1 | 7/2013 | Nordstrom |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0260710 A1 | 10/2013 | Hr |
| 2013/0309994 A1 | 11/2013 | Hellwig et al. |
| 2013/0331055 A1 | 12/2013 | Mckown et al. |
| 2013/0331058 A1 | 12/2013 | Harvey |
| 2014/0031000 A1 | 1/2014 | Hanover |
| 2014/0045450 A1 | 2/2014 | Ballantyne et al. |
| 2014/0051379 A1 | 2/2014 | Ganesh et al. |
| 2014/0057590 A1 | 2/2014 | Romero |
| 2014/0059060 A1 | 2/2014 | Yang et al. |
| 2014/0086108 A1 | 3/2014 | Dunn et al. |
| 2014/0086145 A1 | 3/2014 | Ramkumar et al. |
| 2014/0087680 A1 | 3/2014 | Luukkala et al. |
| 2014/0087780 A1 | 3/2014 | Abhyanker et al. |
| 2014/0095425 A1 | 4/2014 | Sipple |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 * | 5/2014 | Jin .......................... H04W 4/90 455/404.1 |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0218537 A1 | 8/2014 | Nepo |
| 2014/0222462 A1 | 8/2014 | Shakil et al. |
| 2014/0248848 A1 | 9/2014 | Mufti et al. |
| 2014/0253326 A1 | 9/2014 | Cho et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0005554 A1 | 2/2015 | Sedlacek et al. |
| 2015/0038102 A1 | 2/2015 | Yoakum et al. |
| 2015/0038109 A1 | 2/2015 | Salahshour |
| 2015/0054639 A1 | 2/2015 | Rosen |
| 2015/0055453 A1 | 2/2015 | Chaki et al. |
| 2015/0065082 A1 | 3/2015 | Sehgal |
| 2015/0080021 A1 | 3/2015 | Bietz et al. |
| 2015/0081209 A1 | 3/2015 | Yeh et al. |
| 2015/0081927 A1 | 3/2015 | Xu et al. |
| 2015/0085997 A1 | 3/2015 | Biage et al. |
| 2015/0087259 A1 | 3/2015 | Hinsen |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South |
| 2015/0112883 A1 | 4/2015 | Ordun et al. |
| 2015/0137972 A1 | 5/2015 | Nepo et al. |
| 2015/0140936 A1 | 5/2015 | Sachs et al. |
| 2015/0147995 A1 | 5/2015 | Bontu et al. |
| 2015/0172897 A1 | 6/2015 | Mariathasan et al. |
| 2015/0181401 A1 | 6/2015 | Dhandu et al. |
| 2015/0201316 A1 | 7/2015 | Khatibi et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0034961 A1 | 2/2016 | May et al. |
| 2016/0057595 A1 | 2/2016 | Ahmed et al. |
| 2016/0065748 A1 * | 3/2016 | Li ..................... H04M 3/42263 379/45 |
| 2016/0088455 A1 | 3/2016 | Bozik et al. |
| 2016/0142894 A1 | 5/2016 | Papakonstantinou et al. |
| 2016/0173689 A1 | 6/2016 | Klaban |
| 2016/0192167 A1 | 6/2016 | Piett et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni |
| 2016/0307436 A1 | 10/2016 | Nixon |
| 2016/0315923 A1 | 10/2016 | Riscombe-Burton et al. |
| 2016/0316493 A1 | 10/2016 | Davis et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353262 A1 | 12/2016 | Acevedo et al. |
| 2016/0353266 A1 | 12/2016 | Winkler et al. |
| 2016/0363931 A1 | 12/2016 | Yang et al. |

(56) References Cited

U.S. PATENT DOCUMENTS

| | | |
|---|---|---|
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0075407 A1 | 3/2017 | Kritt et al. |
| 2017/0078226 A1 | 3/2017 | Daly et al. |
| 2017/0099579 A1 | 4/2017 | Ryan et al. |
| 2017/0108862 A1 | 4/2017 | Mikkelsen |
| 2017/0116845 A1 | 4/2017 | See et al. |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0142570 A1 | 5/2017 | Self et al. |
| 2017/0150335 A1* | 5/2017 | Self ..................... H04W 4/90 |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0208543 A1 | 7/2017 | Zhang et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1 | 11/2017 | Mehta et al. |
| 2017/0331954 A1 | 11/2017 | Kotnis et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0020329 A1 | 1/2018 | Smith |
| 2018/0039737 A1 | 2/2018 | Dempers et al. |
| 2018/0053394 A1 | 2/2018 | Gersten |
| 2018/0077282 A1 | 3/2018 | Herron et al. |
| 2018/0077553 A1 | 3/2018 | Gideon, III |
| 2018/0150928 A1 | 5/2018 | Dejewski et al. |
| 2018/0176271 A1 | 6/2018 | Laurent |
| 2018/0262544 A1 | 9/2018 | Mehta et al. |
| 2018/0352408 A1 | 12/2018 | Baer et al. |
| 2019/0020993 A1 | 1/2019 | Nguyen |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik et al. |
| 2019/0174289 A1 | 6/2019 | Martin et al. |
| 2019/0205120 A1 | 7/2019 | Sheedy et al. |
| 2019/0230476 A1 | 7/2019 | Qi et al. |
| 2019/0246260 A1 | 8/2019 | Edge et al. |
| 2019/0281165 A1 | 9/2019 | Mehta et al. |
| 2019/0306664 A1 | 10/2019 | Mehta et al. |
| 2019/0320310 A1 | 10/2019 | Horelik et al. |
| 2019/0324825 A1 | 10/2019 | Schwartz et al. |
| 2019/0327597 A1 | 10/2019 | Katz et al. |
| 2019/0342526 A1 | 11/2019 | Drako et al. |
| 2020/0015058 A1 | 1/2020 | Wu |
| 2020/0059776 A1 | 2/2020 | Martin et al. |
| 2020/0100084 A1 | 3/2020 | Martin et al. |
| 2020/0126174 A1 | 4/2020 | Halse et al. |
| 2020/0135005 A1 | 4/2020 | Katz et al. |
| 2020/0242138 A1 | 7/2020 | Russ et al. |
| 2020/0258374 A1 | 8/2020 | Mehta et al. |
| 2020/0344602 A1 | 10/2020 | Li |
| 2021/0014659 A1 | 1/2021 | Mehta et al. |
| 2021/0037368 A1 | 2/2021 | Leavitt et al. |
| 2021/0110686 A1 | 4/2021 | Slavin et al. |
| 2021/0127228 A1 | 4/2021 | Baarman et al. |
| 2021/0266722 A1 | 8/2021 | Pellegrini et al. |
| 2021/0289334 A1 | 9/2021 | Martin et al. |
| 2022/0103995 A1 | 3/2022 | Horelik et al. |
| 2022/0131637 A1 | 4/2022 | Sangal et al. |
| 2022/0167141 A1 | 5/2022 | Anand et al. |
| 2022/0353662 A1 | 11/2022 | Martin et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 205220594 U | 5/2016 |
| CN | 106021508 A | 10/2016 |
| EP | 2161912 A2 | 3/2010 |
| JP | H10314133 A | 12/1998 |
| JP | H1170086 A | 3/1999 |
| JP | 2003272070 A | 9/2003 |
| JP | 2006319946 A | 11/2006 |
| JP | 2006334369 A | 12/2006 |
| JP | 410777 B2 | 6/2008 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO9723104 A1 | 6/1997 |
| WO | WO0022593 A1 | 4/2000 |
| WO | WO0165763 A2 | 9/2001 |
| WO | WO0167419 A2 | 9/2001 |
| WO | WO2007109599 A2 | 12/2007 |
| WO | WO2011060335 A1 | 5/2011 |
| WO | WO2012129561 A1 | 9/2012 |
| WO | WO2014025563 A1 | 2/2014 |
| WO | WO2014063121 A1 | 4/2014 |
| WO | WO2014074420 A1 | 5/2014 |
| WO | WO2014087157 A1 | 6/2014 |
| WO | WO2017112820 A1 | 6/2014 |
| WO | WO2014176646 A1 | 11/2014 |
| WO | WO2015127867 A1 | 9/2015 |
| WO | WO2015196155 A1 | 12/2015 |
| WO | WO2016044540 A1 | 3/2016 |
| WO | WO2016093553 A1 | 6/2016 |
| WO | WO2017079354 A1 | 5/2017 |
| WO | WO2017083571 A1 | 5/2017 |
| WO | WO2017100220 A1 | 6/2017 |
| WO | WO2017106775 A1 | 6/2017 |
| WO | WO2017189610 A2 | 11/2017 |
| WO | WO2017196753 A1 | 11/2017 |
| WO | WO2018039142 A1 | 3/2018 |
| WO | WO2019113129 A1 | 6/2019 |
| WO | WO2020172612 A1 | 8/2020 |
| WO | WO2020205033 A1 | 10/2020 |
| WO | WO2021034859 A1 | 2/2021 |
| WO | WO2021203037 A1 | 10/2021 |

OTHER PUBLICATIONS

National Emergency Number Association (NENA). Social Networking in 9-1-1 PSAPs Information Document (18 pgs) (May 8, 2012).
National Emergency Number Association (NENA) Technical Committee Chairs: NENA functional and Interface Standards for Next Generation 9-1-1 Version 1.0 (13) (121 pgs).
Seattle Real Time Fire 911 Calls. Available at https://catalog.data.gov/dataset/seattle-real-time-fire-911-calls-6cdf3 (3 pgs) (Accessed Sep. 2017).

(56) References Cited

OTHER PUBLICATIONS

Song. Next Generation Emergency Call System with Enhanced Indoor Positioning, Columbia University. Theseis [online] [retrieved Apr. 20, 2020 fropm <url:https://scholar.google.co.k.
Tazaki. Floating Ground: an Architecture for Network Mobility and Ad Hoc Network Convergence. Thesis. Graduate School of Media and Governance Keio University 5322 Endo Fujisaw.
U.S. Census Bureau. Developers: Population Estimates APIs. Available at https://www.census.gov/data/developers/data-sets/popest-popproj/popest.html (2 pgs).
Weather Company Data for IBM Bluemix APIs. Available at https://twcservice.mybluemix.net/rest-api/ (100 pgs) (Accessed Sep. 2017).
Botega, et al. Saw-Oriented User Interfaces for Emergency Dispatch Systems. Computer Vision—Eccv 2020: 16th European Conference, Glasgow, UK, Aug. 23-28, 2020: Proceedings.
Abel et al. Semantics + Filtering + Search = Twitcident exploring information in social web streams. HT'12—Proceedings of 23rd ACM Conference on Hypertext and Social Media.
ArcGIS REST Services Directory. Folder: TIGERWeb. Available at https://tigerweb.geo.census.gov/arcgis/rest/services/TIGERweb. (1 pg.) (Accessed Sep. 2017).
Chohlaswood et al. Mining 911 Calls in New York City: Temporal Patterns, Detection and Forecasting. AAAI Conference on Artificial Intelligence Workshop (Apr. 2015).
Chowdhury, et al. Tweet4act: Using incident-specific profiles for classifying crisis-related messages. Proceedings of the 10th International ISCRAM Conference (pp. 834-839).
Cipolla, et al. A Tool for Emergency Detection with Deep Learning Neural Networks. KDWeb (2016) How to predict a disaster. ICAR—National Research Council of Italy—Palermo.
Hodgkiss, et al. Spatiotemporal Analysis of 911 Call Stream Data. Proceedings of the 2005 national conference on Digital government research (2005).
Homeland Security Science and Technology. Using Social Media for Enhanced Situational Awareness and Decision Support. Virtual Social Medial Working Group and DHS First Respond.
Jasso, et al. Prediction of 911 Call Volumes for Emergency Event Detection. Proceedings of the 8th Annual International Digital Government Research Conference (2007).
Marcus, et al. TwitInfo: Aggregating and Visualizing Microblogs for Event Exploration. ACM CHI Conference May 7-12, 2011, 2011 (10 pgs).

\* cited by examiner

SYSTEM AND METHOD FOR CALL MANAGEMENT

CROSS-REFERENCE

The present application is a Continuation of, and claims priority to, U.S. patent application Ser. No. 17/671,493, filed Feb. 14, 2022, entitled "SYSTEM AND METHOD FOR CALL MANAGEMENT," which claimed priority to, and was a continuation of U.S. patent application Ser. No. 17/448,610, filed Sep. 23, 2021, which is a continuation of U.S. patent application Ser. No. 16/509,296, filed Jul. 11, 2019, now U.S. Pat. No. 11,153,737, which is a continuation of U.S. patent application Ser. No. 15/958,186, filed Apr. 20, 2018, now U.S. Pat. No. 10,425,799, which is a continuation of U.S. patent application Ser. No. 15/436,484, filed Feb. 17, 2017, now U.S. Pat. No. 9,992,655, which is a continuation of U.S. patent application Ser. No. 14/794,780 filed Jul. 8, 2015, now U.S. Pat. No. 9,838,858, which claims priority under 35 USC 119 from U.S. Provisional Application Ser. No. 62/021,709 filed on Jul. 8, 2014, titled SYSTEM AND METHOD FOR CALL MANAGEMENT, the entire disclosures of which are incorporated herein by reference.

FIELD OF THE INVENTION

The invention relates to communication systems and, more particularly, but not exclusively, to a call handling and routing associated with an urgent or emergency call.

BACKGROUND OF THE INVENTION

With the explosive growth in mobile devices, many people are initiating call related to urgent or emergency services using a wireless device or mobile phone. As such, the information associated with the caller or the location of the caller needs to be accurately identified. Current approaches do not provide an accurate location or often fails to provide sufficient information regarding the location. Therefore what is needed is a system and method that provides as much information as possible about a caller and the location of the caller to the emergency call handler.

SUMMARY OF THE INVENTION

A system and method are provided in accordance with the various aspects of the invention that provide information regarding a caller and a call location to the urgent or emergency call handler, which call may be referred to as a distress call. The foregoing is a summary and thus contains, by necessity, simplifications, generalizations and omissions of detail. Those skilled in the art will appreciate that the summary is illustrative only and is not intended to be in any way limiting. The inventive techniques and concepts described herein apply to wireless communications systems including the radio access systems of GSM, UMTS, LTE, LTE-Advanced, IEEE 802 (WiFi, WiMAN, WiMAX), Bluetooth, UWB and NFC.

BRIEF DESCRIPTION OF THE DRAWING

The foregoing summary, as well as the following detailed description, is better understood when read in conjunction with the appended drawings. For the purpose of illustrating the various aspects and embodiments of the invention, the drawings shown exemplary constructions of the aspects of the invention. However, the invention is not limited to the specific methods and instrumentalities disclosed in the drawings, which are as follows.

DETAILED DESCRIPTION OF ILLUSTRATIVE EMBODIMENTS

Illustrative embodiments as found in the various aspects of the invention are disclosed with reference to the figures, wherein like numerals refer to like features. Wireless devices have evolved in both operation and form-factors, converging the personal computer (PC) with the cellular phone, pager, and other communications devices. Besides communications functions (e.g. Voice Telephony, Short-message-service (SMS), Multi-media Messaging Service (MMS), TCP/IP data connectivity) and upgraded general processing power, sensors have been added to the wireless device. For instance, a wireless device (e.g. a smartphone, feature phone, netbook, Personal Digital assistant (PDA), tablet computer or PC with wireless LAN capability) may include:
 Camera/Video functions;
 Location data (Satellite-based);
 Location data (Mobile-based);
 Location data (Network-based);
 Motion data (e.g. compass, accelerometer);
 Capacitive Sensors;
 Address Book, Contacts lists, recent called/emailed data; and
 Application specific sensing, reading and monitoring capabilities.

Figure 1:
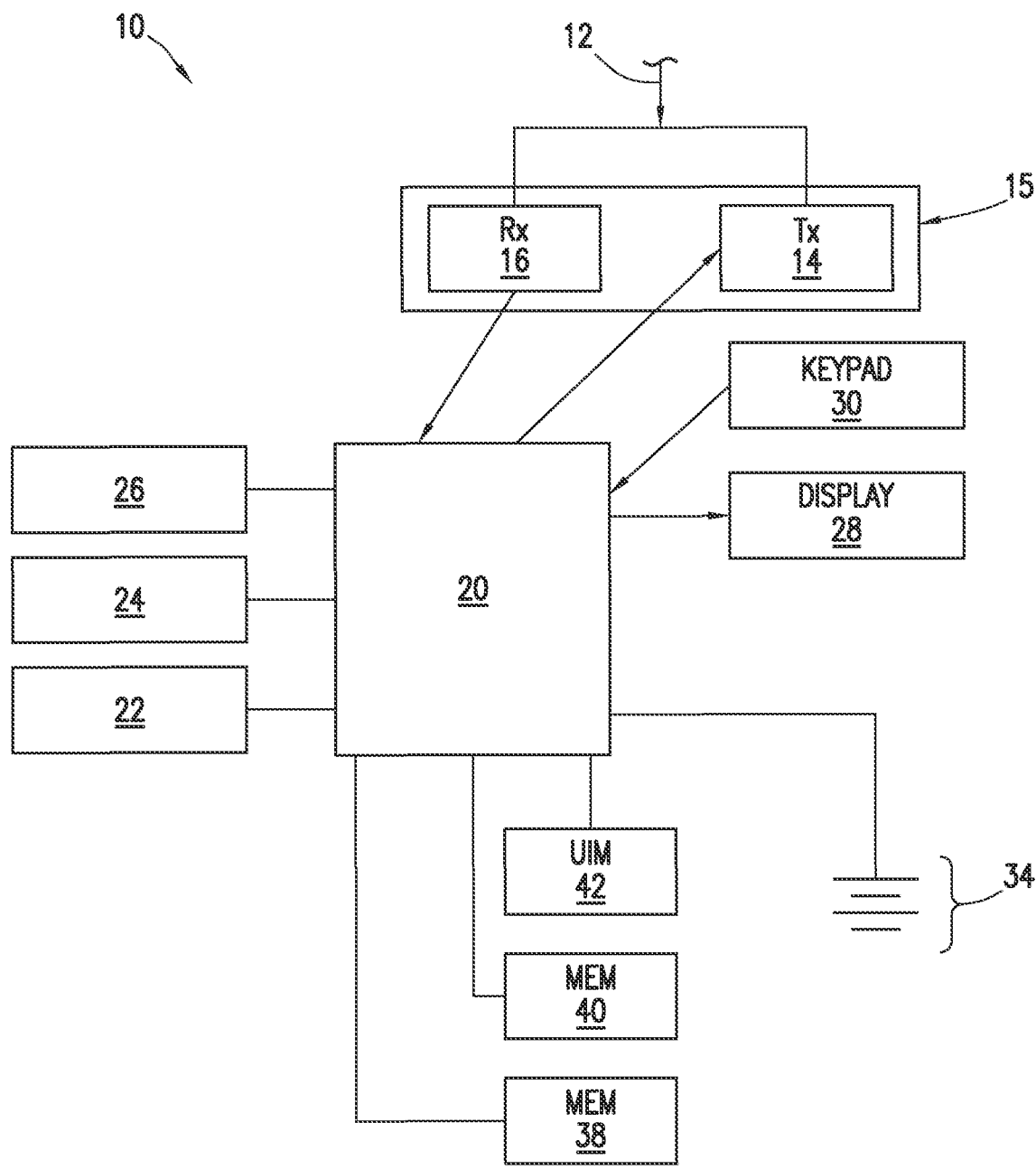
FIG. 1 shows a device within a wireless environment in accordance with the various aspects and embodiments of the invention.
Figure 2:
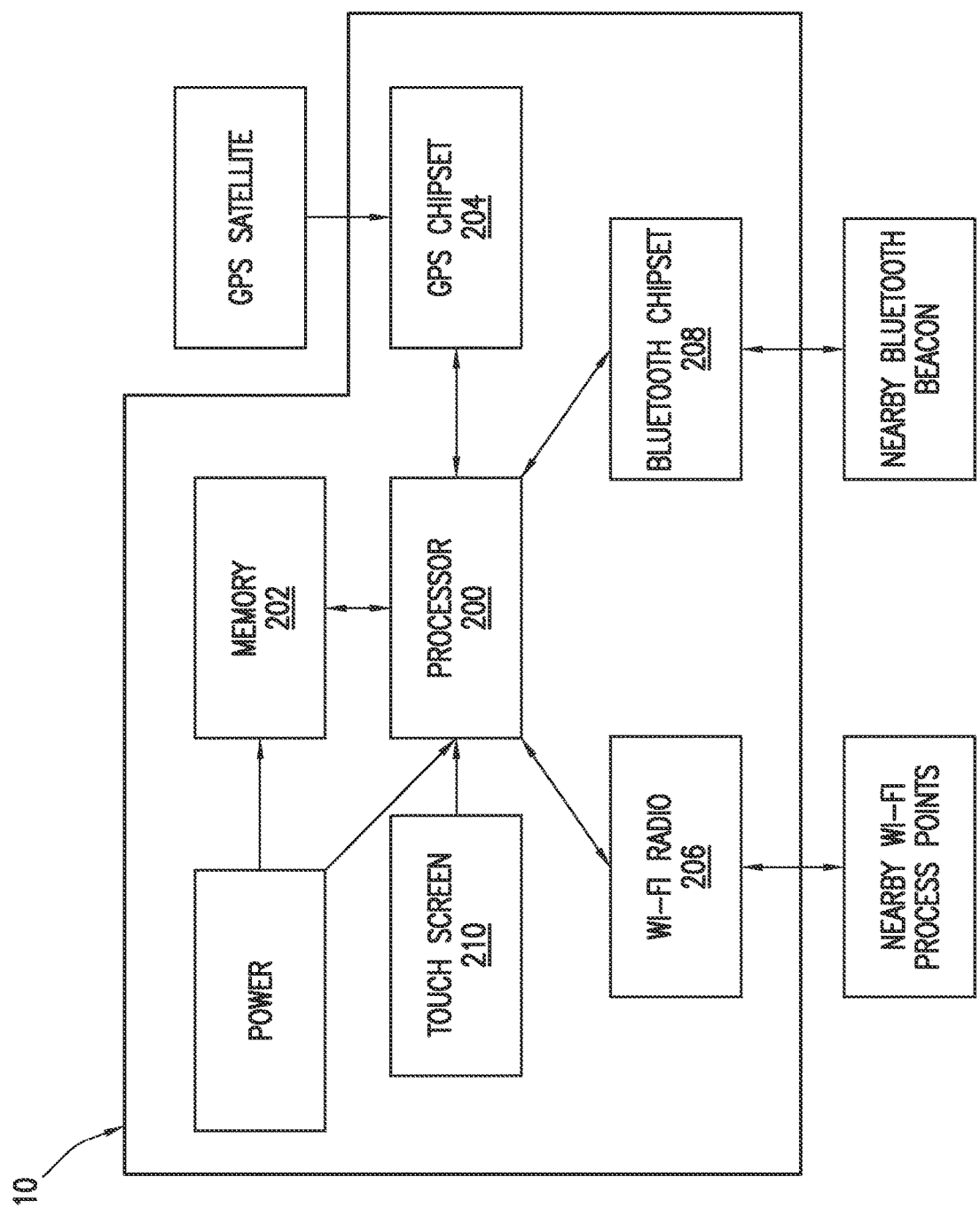
FIG. 2 shows functional elements of a device in accordance with the various aspects and embodiments of the invention.

Referring now to FIG. 1 and FIG. 2, based on the various aspects of the invention, illustrates a block diagram of a wireless device 10, which may also be a mobile telephone or a mobile terminal. It should be understood, however, that the wireless device 10, as illustrated and hereinafter described, is merely illustrative of one type of wireless device and/or mobile device that would benefit from embodiments of the invention and, therefore, should not be taken to limit the scope of embodiments of the invention. While several aspects and embodiments of the wireless and mobile device are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ aspects and embodiments of the invention.

The wireless device 10, as shown in FIG. 2, includes a processor module 200 and a memory module 202. Additionally, In accordance with some aspects of the invention, the wireless device 10 also includes a GPS module or chip 204 that is in communication with a GPS system or satellite. In accordance with some further aspects of the invention, the wireless device 10 includes a Wi-Fi communication module 206 capable of communicating with a nearby Wi-Fi access point or hotspot. In accordance with further aspects of the invention, the wireless device 10 includes a Bluetooth communication module 208 capable of initiating a Bluetooth communication session when a nearby Bluetooth beacon is detected. In accordance with aspects of the invention, the wireless device 10 also includes a display or touch screen 210 that is in communication with the processor module 200.

In addition, while several embodiments of the method of the invention are performed or used by a wireless device 10, the method may be employed by other than a mobile terminal. Moreover, while the system and method of embodiments of the invention will be primarily described in conjunction with mobile communications applications, it will be appreciated by one skilled in the art that the system and method of embodiments of the invention can be utilized in conjunction with a variety of other applications, both in the mobile communications industries and outside of the mobile communications industries.

Referring again to FIG. 1, the wireless device 10 includes an antenna 12 (or multiple antennae) in operable connection or communication with a transmitter 14 and a receiver 16 in accordance with one aspect of the invention. In accordance with other aspects of the invention, the transmitter 14 and the receiver 16 may be part of a transceiver 15. The wireless device 10 may further include an apparatus, such as a controller 20 or other processing element, which provides signals to and receives signals from the transmitter 14 and receiver 16, respectively. The signals include signaling information in accordance with the air interface standard of the applicable cellular system, and also user speech, received data and/or user generated data. In this regard, the wireless device 10 is capable of operating with one or more air interface standards, communication protocols, modulation types, and access types.

Figure 3:
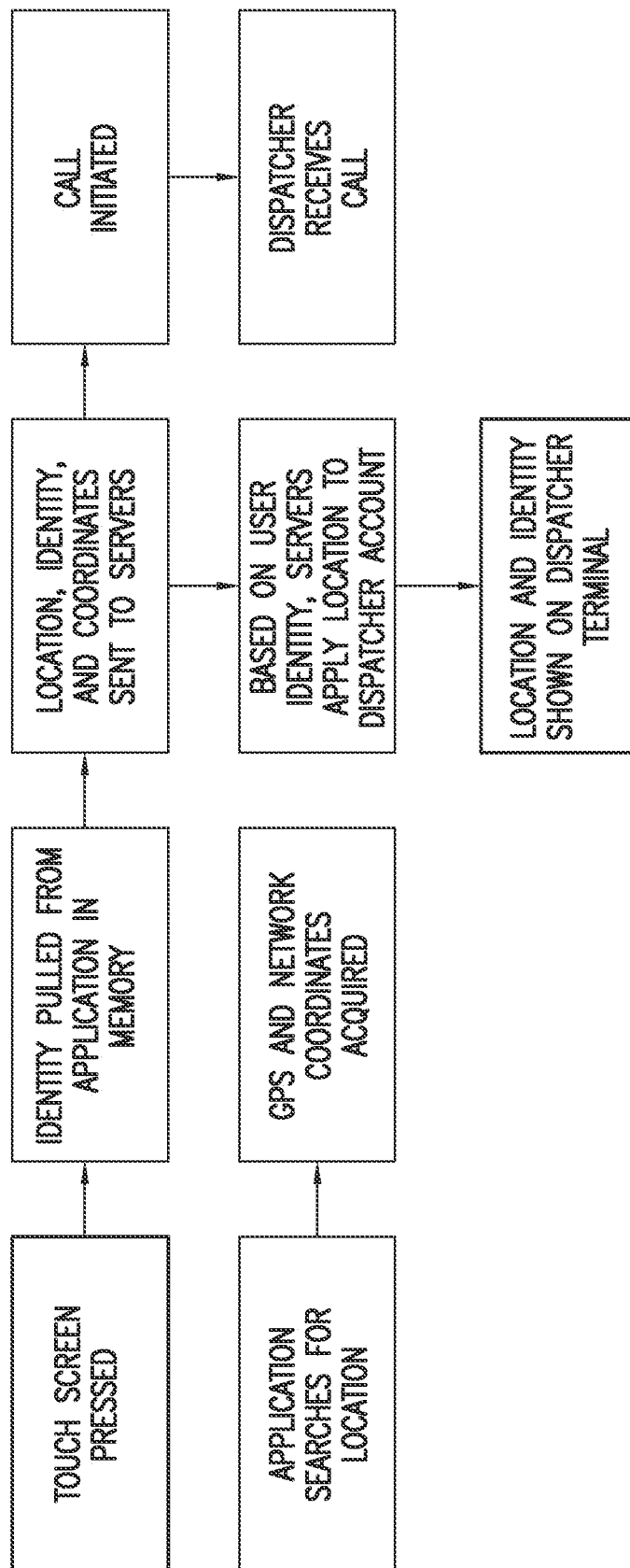
FIG. 3 shows a flow process that includes steps in initiating a call and routing the call in accordance with the various aspects and embodiments of the invention.

Referring now to FIG. 3 a process of sending a message to an urgent or emergency call handler is shown. The process is initiated, in accordance with some aspects of the invention, through a touch screen or display of the wireless device 10. The user initiates the process by pressing an icon or some specific location on the screen of the wireless device 10. The wireless device 10 sends a message, such as an SMS message, to a dispatcher or call handler. The dispatcher may also receive a call that is related to or associated with the message being delivered to the call handler. The message sent to the dispatcher or call handler may include information about the location of the caller.

For example, in accordance with the aspects of the invention, the message includes the location of the wireless device 10 based on or relative to a map. The dispatcher's system or computer runs an application or program that can receive the message, then the message is received by the dispatcher and the location of the wireless device 10 is shown on the map. Once the request from the wireless device 10 is initiated, identify information about the caller is retrieved from the memory of the wireless device 10.

Additional information, in accordance with some aspects of the invention, including location and identity and coordinates is sent to the dispatcher's system from the wireless device 10. The call is initiated with the dispatcher and the dispatcher or call handler receives that call as well as the location and identity information. In accordance with some aspects of the invention, the caller's location is referenced with respect to a landmark or well known address. For example, the location is in relation to another object such as a landmark or address as "the caller is 100 feet north of the Statue of Liberty." Thus, there are several aspects of the invention that relate to providing location information or locating the caller and the scope of the invention is not limited thereby.

As will be apparent to one skilled in the art, the information may be sent, in accordance with the aspects of the invention, from the wireless device 10 to a remote location that collects the information associated with the initiation of the message and the wireless device 10 and send that in the form of a message to the dispatcher's system.

Figure 4:
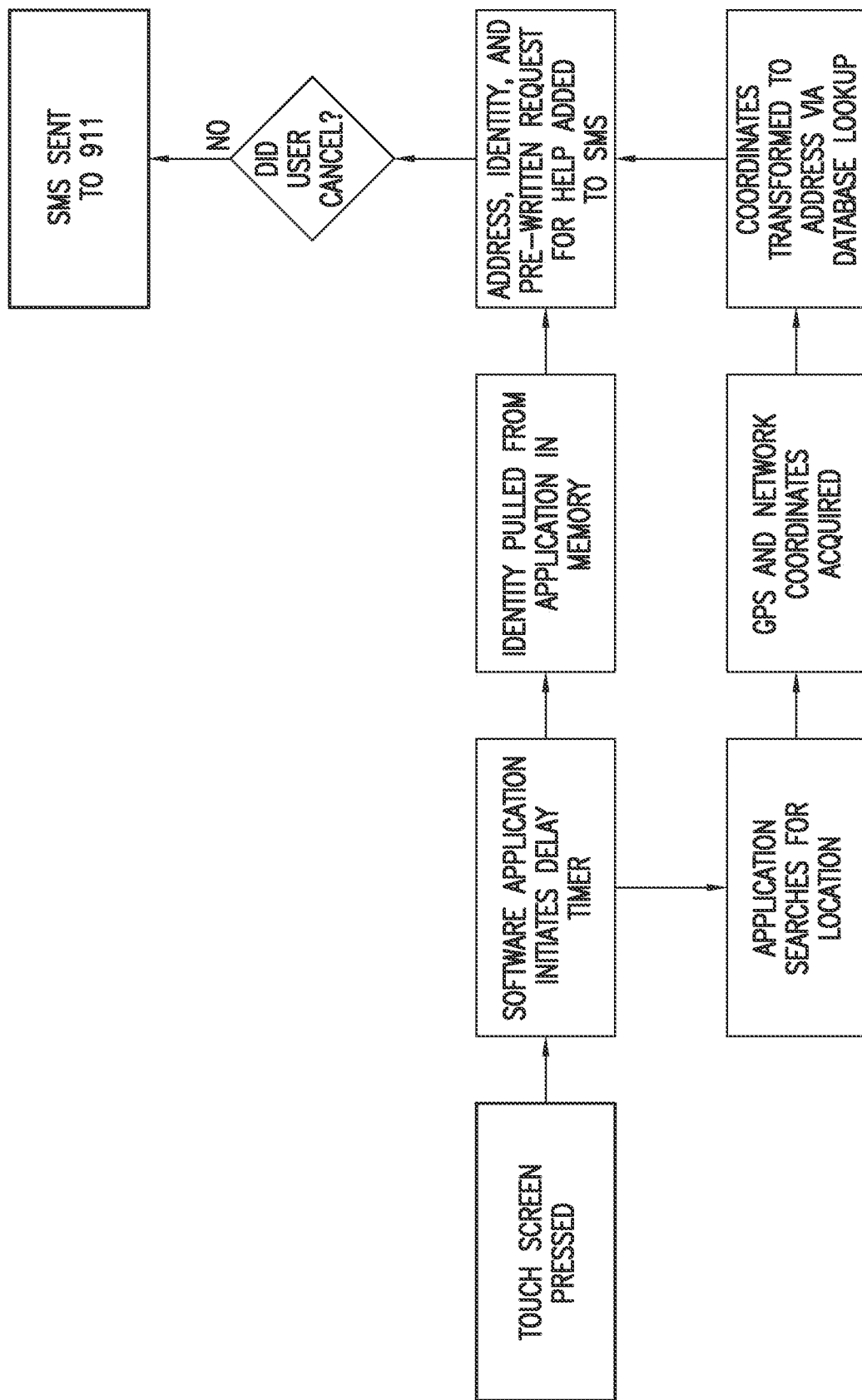
FIG. 4 shows a flow process for delivering a message in accordance with the various aspects and embodiments of the invention.

Referring now to FIG. 4, a process is shown for initiating a call. This time the message is delayed by an application running on the wireless device 10 while the application on the wireless device 10 searches for location information based on nearby networks, such as Wi-Fi or Bluetooth based networks, as well as GPS location information. The application can then add the additional information, as outlined below, to the message in the form of information or an SMS message.

The additional information, in accordance with some aspects of the invention, may include coordinates that are transformed into a local address via a database that is associated with the nearest Wi-Fi/Bluetooth network's physical location. This will help provide a higher degree of location information to the call handler. In accordance with further aspects of the invention, the SMS that is sent may include additional information, including the nature or reason for the call. In accordance with some aspects of the invention, the additional information includes specific information regarding the user. For example, the wireless devices 10 may have personal medical information for the caller, in the instance that the caller is the person in need of a medical assistance. In accordance with other aspects, the wireless device may include information—medical and non-medical—collected about the person in need of medical assistance. For example, the wireless device 10 may have captured a photo or a video—associated with the emergency situation or the location—that is provided as part of the additional information. In accordance with additional aspects of the invention the wireless device 10 can provide any other medical information or identifying information to allow the responder to better prepare for responding and easily locate or spot the message sender.

Figure 5:
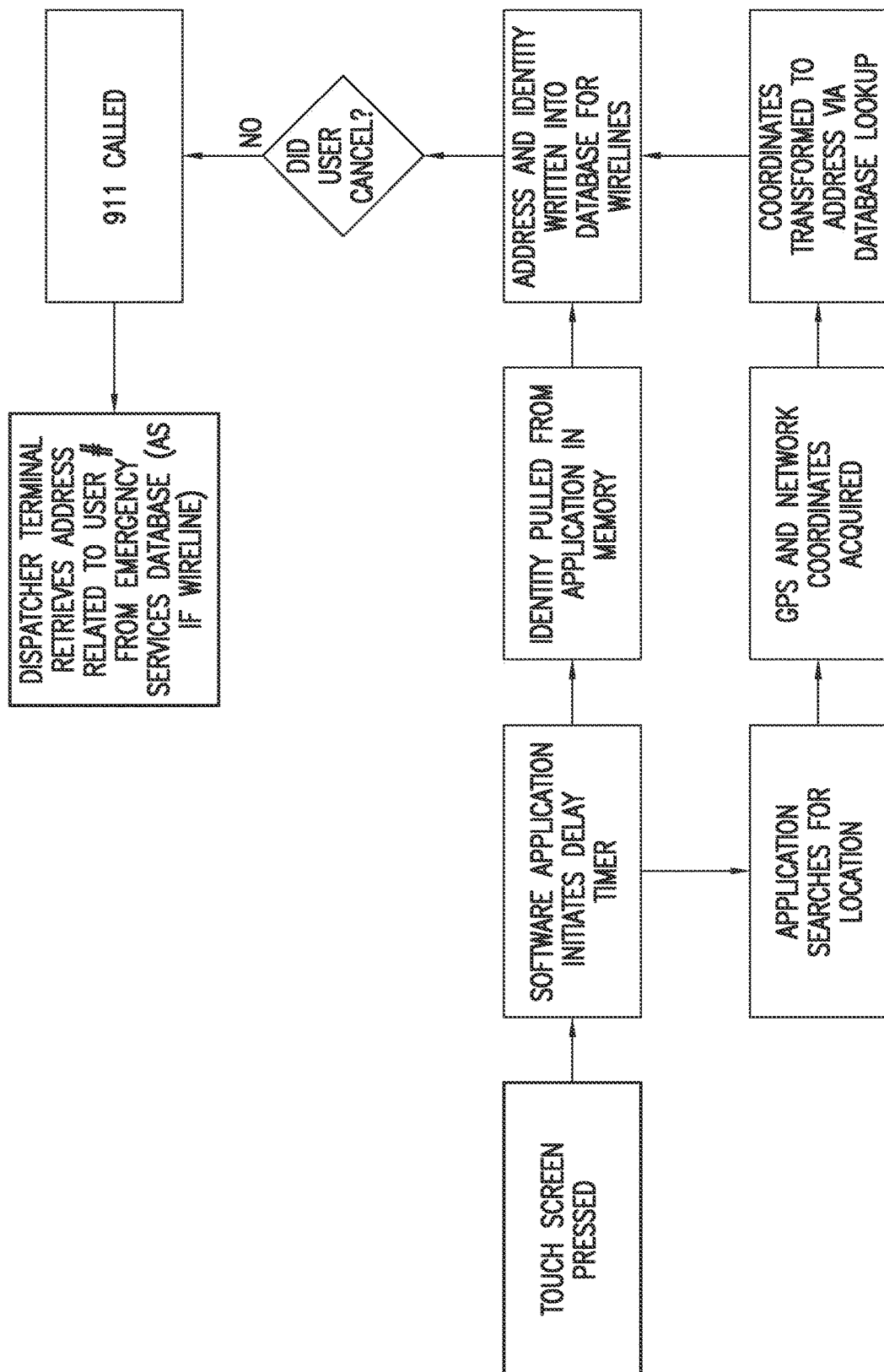
FIG. 5 shows a flow process that includes steps in initiating a call and routing the call to simulating a landline in accordance with the various aspects and embodiments of the invention.

Referring now to FIG. 5, in accordance with some aspects of the invention, a call is initiated through the touch screen of the wireless device 10 using a quick access simple tap or button selection. The call is delayed by the wireless device while the application on the device searches for location information based on nearby networks, such as Wi-Fi or Bluetooth based networks, as well as GPS location information. The application adds the additional information, as outlined in FIG. 5, to the call details. The additional information, in accordance with some aspects of the invention, may include coordinates that are transformed into a local address via a database that stores lookup information that is associated with the nearest Wi-Fi/Bluetooth network's physical location. This additional information is provided to the call handler such that the call handler detects a call and can retrieve address information that was written to the emergency database associated with this call before the call was routed to the call handler.

Figure 6:
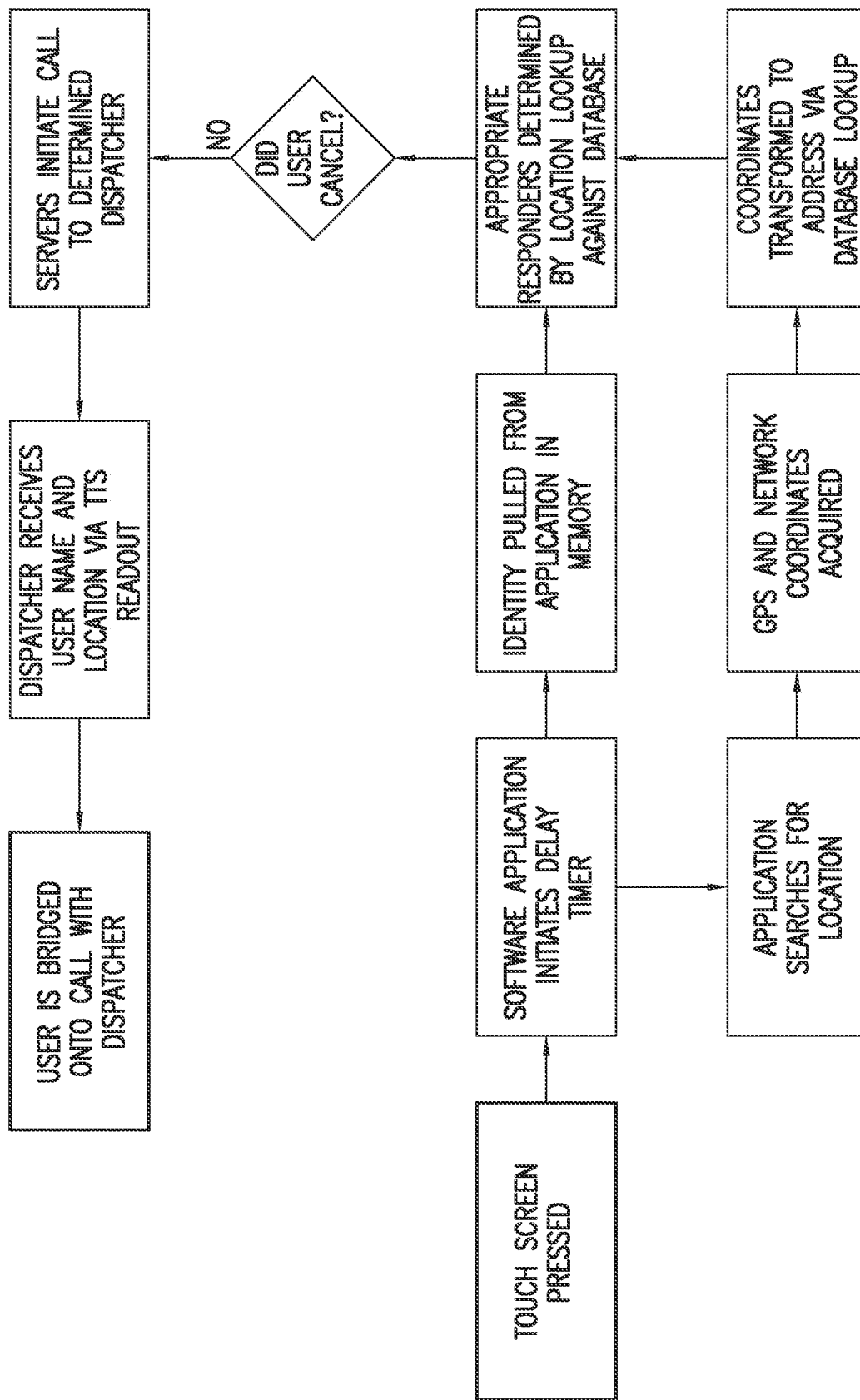
FIG. 6 shows a flow process that includes steps in initiating a call and routing the call to a call handler and a third party in accordance with the various aspects and embodiments of the invention.

Referring now to FIG. 6, in accordance with some aspects of the invention, a call is initiated through the touch screen of the wireless device 10 using a tap or button selection features on the touch screen for the purpose of initiating the call. In accordance with one aspect of the invention, the access button may be designed to initiate both an emergency call and a call to a location's private security. In accordance with other aspects and feature of the embodiments of the invention, there may be provided separate call initiation features on the touch screen that each provide a call to a respective call handler, with one being for 911 emergency call and the other being for a private call handler for help that does not rise to the level of 911 emergencies, such as assistance with automobile failure or other similar forms of help.

Once the call is initiated, the application on the wireless device 10 delays the call while the application on the wireless device 10 searches for location information based on nearby networks, such as Wi-Fi or Bluetooth based networks, as well as GPS location information. The application adds the additional information, as outlined in FIG. 5, to the call details. The additional information, in accordance with some aspects of the invention, may include coordinates that are transformed into a local address via a database that stores lookup information associated with the nearest Wi-Fi/ Bluetooth network's physical location. This additional information is provided to the call handler, such that the call handler detects a call and can retrieve address information that was written to the emergency database associated with this call before the call was routed to the call handler. The call handler may receive the information in text form, on a display, as a text-to-speech file, or any other format that is required by the call handler. Once the information associated with the call is provided, the user is then bridged onto the call with the dispatcher.

In accordance with further aspects of the invention, the call that is initiated by the user at the touch screen may be routed to a remote server or location and any or all of the features performed at the wireless device 10, as outlined above, may be handled off the wireless device 10 by the remote location. Thus, when a request is received via user input on the touchscreen of the wireless device 10, this initiates the processor to look up in memory what to execute. The application and the user setting, in accordance with the various aspects of the invention, determine if the executed software application initiates the process of determining the smartphone's location or if that function is passed on to a remote server or location. For example, in accordance with one aspect of the invention, the GPS chipset 204 approximates position by continuously receiving the signal of the nearest satellites and then comparing signal strength. This provides initial latitude and longitudinal coordinates of the wireless device 10. In accordance with further aspects of the invention, the latitude and longitudinal coordinates are refined as the Wi-Fi radio processes the broadcast signal of the nearest access points. By comparing the relative strength of the nearby access point's signals to the known location of the access points, via software, a more accurate position is obtained. This further refines the given latitude and longitude coordinates.

In accordance with further aspects of the invention, if there is a nearby Bluetooth beacon, which is uniquely registered to a specific location or address, then that location is used to further enhance the location information for the initiated call and it is sent to the call handlers or emergency responders. If not, the Wi-Fi refined longitude and latitude GPS components are referenced against a database via an application programming interface to produce an identifiable address (reverse geo-coding).

Referring again to FIG. 4, in accordance with the various aspects of the invention, the address, either from the Bluetooth network or Wi-Fi refined GPS lookup, is then added to or inserted, by the software, into a programmatically created short message (SMS) along with user's name and a standard message. This programmatically created SMS is then sent to 911, dispatcher, call handler, and/or the emergency services, unless the user cancels the alert during the built in delay timer.

By way of illustration, the wireless device 10 is capable of operating in accordance with any of a number of first, second, third and/or fourth-generation communication protocols or the like. For example, the wireless device 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

As an alternative (or additionally), the wireless device 10 may be capable of operating in accordance with non-cellular communication mechanisms. For example, the wireless device 10 may be capable of communication in a wireless local area network (WLAN) or other communication networks. The wireless device 10 can also have multiple networking capabilities including nomadic wired tethering, local-area-network transceivers (e.g. IEEE802 Wi-Fi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

A single site location based on the geographic location of the wireless network transmission antenna and the beacon ID (e.g. BTS ID, Cell ID, SSID) may be developed either by the wireless device 10, the remote location or the network; use of timing information of the signal path between the wireless device 10 and network may allow enhancement of the single site location. Using several beacon identities and power levels potentially may increase accuracy over a single site location using a power-difference-of-arrival technique.

Databases of beacon identifiers, beacon power levels, and network transmitter geographical locations may be uploaded to the wireless device 10 allowing for use of the aforementioned techniques using just the passive receiver(s) of the wireless device 10. A transmission (or series of transmissions) from the wireless device 10 is enough to localize a transmitter. An interaction of the wireless device 10 with the network where identifiers either physical (e.g. Electronic Serial Number, Media Access Control (MAC) address); or virtual (e.g. Temporary Mobile Station Identifier (TMSI) or IP address) can allow both localization and identification of the wireless device 10.

Referring again to FIG. 1 and now to FIG. 2, in accordance with the aspects of the invention, an exemplary instance of a system is shown. It is understood that the apparatus, such as the controller 20, may include circuitry desirable for implementing audio and logic functions of the wireless device 10. For example, the controller 20 may include a digital signal processor device, a microprocessor device, and various analog to digital converters, digital to analog converters, and other support circuits including digital signal processors. Control and signal processing functions of the wireless device 10 are allocated between these devices according to their respective capabilities and design. The controller 20 may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the wireless device 10 to transmit and receive Web content, such as location-based content and/or other web page content, according to a Wireless Application Protocol (WAP), Hypertext Transfer Protocol (HTTP) and/or the like, for example.

The wireless device 10 may also comprise a user interface including an output device such as a conventional earphone or speaker 24, a ringer 22, a microphone 26, a display or touch screen 28, and a user input interface, all of which are coupled to the controller 20. The user input interface, which allows the wireless device 10 to receive data, may include any of a number of devices allowing the wireless device 10 to receive data, such as a keypad 30, a touch display (not shown) or other input device. In embodiments including the keypad 30, the keypad 30 may include the conventional numeric (0-9) and related keys (#, *), and other hard and soft keys used for operating the wireless device 10. Alternatively, the keypad 30 may include a conventional QWERTY keypad arrangement. The keypad 30 may also include various soft keys with associated functions. In addition, or alternatively, the wireless device 10 may include an interface device such as a joystick or other user input interface. The wireless device 10 further includes a battery 34, such as a vibrating battery pack, for powering various circuits that are required to operate the wireless device 10, as well as optionally providing mechanical vibration as a detectable output.

The wireless device 10 may further include a user identity module (UIM) 42. The UIM 42 is typically a memory device having a processor built in. The UIM 42 may include, for example, a subscriber identity module (SIM), a universal integrated circuit card (UICC), a universal subscriber identity module (USIM), a removable user identity module (R-UIM), etc. The UIM 42 typically stores information elements related to a mobile subscriber. In addition to the UIM 42, the wireless device 10 may be equipped with memory. For example, the wireless device 10 may include volatile memory 40, such as volatile Random Access Memory (RAM) including a cache area for the temporary storage of data. The wireless device 10 may also include other non-volatile memory 38, which can be embedded and/or may be removable. The non-volatile memory 38 can additionally or alternatively comprise an electrically erasable programmable read only memory (EEPROM), flash memory or the like. The memories can store any of a number of pieces of information, and data, used by the wireless device 10 to implement the functions of the wireless device 10. For example, the memories can include an identifier, such as an international mobile equipment identification (IMEI) code, capable of uniquely identifying the wireless device 10. Furthermore, the memories may store instructions for determining cell id information. Specifically, the memories may store an application program for execution by the controller 20, which determines an identity of the current cell, i.e., cell id identity or cell id information, with which the wireless device 10 is in communication.

Although not every element of every possible mobile network is shown and described herein, it should be appreciated that the wireless device 10 may be coupled to one or more of any of a number of different networks through a base station (not shown). In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the invention, as should dual or higher mode mobile stations (e.g., digital/analog or TDMA/CDMA/analog phones).

The wireless device 10 can further be coupled to one or more wireless access points (APs) (not shown). The APs may comprise access points configured to communicate with the wireless device 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs may be coupled to the Internet (not shown). The APs can be directly coupled to the Internet. In accordance with other aspects of the invention, the APs are indirectly coupled to the Internet. Furthermore, in one embodiment, the BS may be considered as another AP. As will be appreciated, by directly or indirectly connecting the wireless devices 10 to the Internet, the wireless device 10 can communicate with other devices, a computing system, etc., to thereby carry out various functions of the wireless device 10, such as to transmit data, content or the like to, and/or receive content, data or the like from other devices. As used herein, the terms "data," "content," "information" and similar terms may be used interchangeably to refer to data capable of being transmitted, received and/or stored in accordance with the various aspects and embodiments of the invention. Thus, use of any such terms should not be taken to limit the spirit and scope of embodiments of the invention.

Although not shown, the wireless device 10 may communicate in accordance with, for example, RF, BT, IrDA or any of a number of different wireline or wireless communication techniques, including LAN, WLAN, WiMAX, UWB techniques and/or the like. One or more of the computing systems that are in communication with the wireless device 10 can additionally, or alternatively, include a removable memory capable of storing content, which can thereafter be transferred to the wireless device 10. Further, the wireless device 10 can be coupled to one or more electronic devices, such as displays, printers, digital projectors and/or other multimedia capturing, producing and/or storing devices (e.g., other terminals). Furthermore, it should be understood that embodiments of the invention may be resident on a communication device such as the wireless device 10, or may be resident on a network device or other device accessible to the wireless device 10.

In accordance with the various aspects of the invention, the wireless device 10 includes on board location systems. While the on-board location systems (e.g. Global-Navigation-Satellite-System Receivers (GNSS)) may be used to develop a location estimate for the wireless device 10, the location of a wireless device 10 may be determined from the interaction (i.e. radio messaging) between the wires device 10 and the network (e.g. cellular system, WiMAN, WiMAX, WiFi, Bluetooth, NFC).

The true scope the invention is not limited to the various aspects of the invention or presently preferred embodiments disclosed herein and indeed could be applied to any reprogrammable remote sensing or other computing device with a wireless communications facility. For example, the foregoing disclosure of a presently preferred embodiment of the Intelligent Access Control System uses explanatory terms, such as mobile device, cellular system and wireless local area network and the like, which should not be construed so as to limit the scope of protection of the following claims, or to otherwise imply that the inventive aspects of the intelligent access control system are limited to the particular methods and apparatus disclosed. Moreover, as will be understood by those skilled in the art, many of the inventive aspects disclosed herein are based on software applications and operating systems running on generic hardware processing platforms. These functional entities are, in essence, programmable data collection, analysis, and storage devices that could take a variety of forms without departing from the inventive concepts disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

It is noted that, as used in this description, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the invention. Thus, appearances of the phrases "in one embodiment," "in at least one embodiment," "in an embodiment," "in certain embodiments," and similar language throughout this specification may, but do not necessarily, all refer to the same embodiment.

It will be apparent that various aspects of the invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the teaching of the invention and certain embodiments, a program or code may be noted as running on a computing device. A computing device is an article of manufacture. Examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computing device) includes a non-transitory computer readable medium having a series of instructions, such as computer readable program steps encoded therein. In certain embodiments, the non-transitory computer readable medium includes one or more data repositories. The non-transitory computer readable medium includes corresponding computer readable program code and may include one or more data repositories. Processors access the computer readable program code encoded on the corresponding non-transitory computer readable mediums and execute one or more corresponding instructions.

Other hardware and software components and structures are also contemplated. Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. Rather, the scope and spirit of invention is embodied by the appended claims.

What is claimed is:

1. A server system in operative communication with a network and comprising one or more processors configured to:
   detect a request, initiated at a computing device in operative communication with the network, to contact emergency services;
   receive identity information and a location associated with the computing device;

generate a message comprising the identity information and the location associated with the computing device; and transmit the message comprising the identity information and the location associated with the computing device to an emergency call handler that receives a call related to the message.

2. The server system of claim 1, wherein the one or more processors are further configured to receive the location associated with the computing device from the computing device.

3. The server system of claim 1, wherein the one or more processors are further configured to detect initiation of the call related to the message and received by the emergency call handler.

4. The server system of claim 3, wherein the one or more processors are further configured to detect initiation of the call related to the message and received by the emergency call handler before transmitting the message comprising the identity information and the location associated with the computing device to the emergency call handler.

5. The server system of claim 1, wherein the one or more processors are further configured to transmit the message comprising the identity information and the location associated with the computing device to an application, executed on a computer associated with the emergency call handler, that can receive the message.

6. The server system of claim 5, wherein the one or more processors are further configured to transmit the message comprising the identity information and the location associated with the computing device to the emergency call handler in a text message form.

7. The server system of claim 1, wherein the one or more processors are further configured to reverse geocode the location associated with the computing device to produce an identifiable address and include the identifiable address in the message transmitted to the emergency call handler.

8. The server system of claim 1, wherein the one or more processors are further configured to gather medical information associated with a user of the computing device and include the medical information associated with the user of the computing device in the message transmitted to the emergency call handler.

9. The server system of claim 1, wherein the one or more processors are further configured to determine the emergency call handler as appropriate to receive the message comprising the identity information and the location associated with the computing device based at least in part on the location associated with the computing device.

10. The server system of claim 1, wherein the request to contact emergency services is initiated through a user interface of the computing device.

11. A method for contacting emergency services, the method comprising:

detecting a request, initiated at a computing device in operative communication with a network, to contact emergency services;

receiving, at a server system in operative communication with the network, identity information and a location associated with the computing device;

generating, at the server system, a message comprising the identity information and the location associated with the computing device; and transmitting, from the server system, the message comprising the identity information and the location associated with the computing device to an emergency call handler that receives a call related to the message.

12. The method of claim 11, further comprising:
receiving the location associated with the computing device from the computing device.

13. The method of claim 11, further comprising:
detecting initiation of the call related to the message and received by the emergency call handler.

14. The method of claim 13, further comprising:
detecting initiation of the call related to the message and received by the emergency call handler before transmitting the message comprising the identity information and the location associated with the computing device to the emergency call handler.

15. The method of claim 11, further comprising:
transmitting the message comprising the identity information and the location associated with the computing device to an application executed on a computer associated with the emergency call handler, that can receive the message.

16. The method of claim 15, further comprising:
transmitting the message comprising the identity information and the location associated with the computing device to the emergency call handler in a text message.

17. The method of claim 11, further comprising:
reverse geocoding the location associated with the computing device to produce an identifiable address; and
including the identifiable address in the message transmitted to the emergency call handler.

18. The method of claim 11, further comprising:
gathering medical information associated with a user of the computing device; and
including the medical information associated with the user of the computing device in the message transmitted to the emergency call handler.

19. The method of claim 11, further comprising:
determining the emergency call handler as appropriate to receive the message comprising the identity information and the location associated with the computing device based at least in part on the location associated with the computing device.

20. The method of claim 11, wherein the request to contact emergency services is initiated through a user interface of the computing device.

* * * * *